United States Patent
Borate et al.

(10) Patent No.: US 11,599,507 B2
(45) Date of Patent: Mar. 7, 2023

(54) DEDUPLICATED MERGED INDEXED OBJECT STORAGE FILE SYSTEM

(71) Applicant: Druva Inc., Sunnyvale, CA (US)

(72) Inventors: Milind Borate, Pune (IN); Alok Kumar, Bihar (IN); Aditya Agrawal, Patna (IN); Anup Agarwal, Shivane Pune (IN); Somesh Jain, Pashan (IN); Aditya Kelkar, Pune (IN); Yogendra Acharya, Pune (IN); Anand Apte, Pune (IN); Amit Kulkarni, Pune (IN)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 17/546,524

(22) Filed: Dec. 9, 2021

(65) Prior Publication Data
US 2022/0100708 A1    Mar. 31, 2022

Related U.S. Application Data

(62) Division of application No. 16/171,010, filed on Oct. 25, 2018, now Pat. No. 11,256,667.

(30) Foreign Application Priority Data

Oct. 26, 2017   (IN) .............................. 201741038018
Apr. 18, 2018   (IN) .............................. 201841014685

(51) Int. Cl.
    *G06F 16/00*    (2019.01)
    *G06F 16/174*   (2019.01)
    (Continued)

(52) U.S. Cl.
    CPC ........ *G06F 16/1748* (2019.01); *G06F 16/122* (2019.01); *G06F 16/128* (2019.01);
    (Continued)

(58) Field of Classification Search
    CPC .................................................. G06F 16/1873
    See application file for complete search history.

(56) References Cited

U.S. PATENT DOCUMENTS 5,604,862 A    2/1997   Midgely et al.
5,649,200 A    7/1997   Leblang et al.
(Continued)

OTHER PUBLICATIONS

Amazon. "Protecting Data Using Server-Side Encryption with Customer-Provided Encryption Keys (SSE-C)", Dec. 2, 2016, available from <https://web.archive.org/web/20161202043642/https://docs.aws.amazon.com/AmazonS3/latest/dev/ServerSideEncryptionCustomerKeys.html>.
(Continued)

*Primary Examiner* — Ajith Jacob
(74) *Attorney, Agent, or Firm* — Fenwick & West LLP

(57) ABSTRACT

A file system may include an object storage, a merged index, and a distributed database. When a file is stored in the file system, the file may be converted to an object and be stored in the object storage. The deduplication index of the file may be stored in the distributed database. The namespace metadata of the file may be stored in the merged index. The merged index generates namespace entries of the file when the file is created, deleted, and/or modified. A namespace entry may be associated with a specific file and may include a creation version and a deletion version. When a file is deleted or modified, instead of modifying the existing namespace entries, new entries associated with different versions and including different creation or deletion versions are created. The status of a file may be monitored by one or more entries associated with a file.

20 Claims, 11 Drawing Sheets

(51) Int. Cl.
  *G06F 16/23* (2019.01)
  *G06F 16/11* (2019.01)
  *G06F 16/21* (2019.01)
  *G06F 16/18* (2019.01)
  *G06F 16/27* (2019.01)
  *G06F 16/13* (2019.01)

(52) U.S. Cl.
  CPC .......... *G06F 16/13* (2019.01); *G06F 16/1873* (2019.01); *G06F 16/219* (2019.01); *G06F 16/2329* (2019.01); *G06F 16/27* (2019.01)

(56) References Cited

U.S. PATENT DOCUMENTS

| | | |
|---|---|---|
| 6,278,992 B1 | 8/2001 | Curtis et al. |
| 6,349,308 B1 | 2/2002 | Whang et al. |
| 6,574,640 B1 | 6/2003 | Stahl |
| 7,680,830 B1 | 3/2010 | Ohr et al. |
| 7,693,877 B1 | 4/2010 | Zasman |
| 7,761,456 B1 | 7/2010 | Cram et al. |
| 7,797,279 B1 | 9/2010 | Starling et al. |
| 8,170,991 B1 | 5/2012 | Dhakras et al. |
| 8,621,240 B1 | 12/2013 | Auchmoody et al. |
| 8,793,466 B2 | 7/2014 | Shao et al. |
| 9,292,521 B1 | 3/2016 | Goo et al. |
| 9,342,524 B1 | 5/2016 | Doty |
| 10,275,317 B2 | 4/2019 | Borate et al. |
| 2003/0046313 A1 | 3/2003 | Leung et al. |
| 2003/0120751 A1 | 6/2003 | Husain et al. |
| 2005/0044089 A1 | 2/2005 | Wu et al. |
| 2005/0055519 A1 | 3/2005 | Stuart et al. |
| 2005/0108189 A1 | 5/2005 | Samsonov |
| 2006/0010150 A1 | 1/2006 | Shaath et al. |
| 2007/0185936 A1 | 8/2007 | Derk et al. |
| 2007/0288490 A1 | 12/2007 | Longshaw |
| 2008/0034268 A1 | 2/2008 | Dodd et al. |
| 2008/0222219 A1 | 9/2008 | Varadarajan |
| 2008/0307333 A1 | 12/2008 | McInerney et al. |
| 2009/0043774 A1 | 2/2009 | Sudhakar |
| 2009/0089340 A1 | 4/2009 | Ohr et al. |
| 2010/0161561 A1 | 6/2010 | Moore et al. |
| 2010/0161569 A1 | 6/2010 | Refer |
| 2011/0004607 A1 | 1/2011 | Lokam et al. |
| 2011/0093471 A1 | 4/2011 | Brockway et al. |
| 2012/0089569 A1 | 4/2012 | Mason et al. |
| 2012/0124306 A1 | 5/2012 | Abercrombie et al. |
| 2012/0179656 A1 | 7/2012 | Bunte et al. |
| 2013/0111262 A1 | 5/2013 | Taylor et al. |
| 2013/0275480 A1 | 10/2013 | Dhuse et al. |
| 2015/0222883 A1 | 8/2015 | Welch |
| 2015/0237336 A1 | 8/2015 | Sylvan et al. |
| 2015/0261776 A1 | 9/2015 | Attarde et al. |
| 2015/0261792 A1 | 9/2015 | Attarde et al. |
| 2015/0288944 A1 | 10/2015 | Nistico et al. |
| 2015/0346495 A1 | 12/2015 | Welch et al. |
| 2016/0005179 A1 | 1/2016 | Petyushko et al. |
| 2016/0026755 A1 | 1/2016 | Byrnes et al. |
| 2016/0091720 A1 | 3/2016 | Stafford et al. |
| 2016/0132524 A1* | 5/2016 | Rao .......... G06F 16/48 707/692 |
| 2016/0139836 A1 | 5/2016 | Nallathambi et al. |
| 2016/0219269 A1 | 7/2016 | Tekolste |
| 2016/0240013 A1 | 8/2016 | Spitzer |
| 2016/0371886 A1 | 12/2016 | Thompson et al. |
| 2017/0031435 A1 | 2/2017 | Raffle et al. |
| 2017/0140224 A1 | 5/2017 | Wilson et al. |
| 2017/0169038 A1 | 6/2017 | Borate et al. |
| 2017/0212915 A1 | 7/2017 | Borate et al. |
| 2017/0227777 A1 | 8/2017 | Carollo et al. |
| 2017/0277590 A1 | 9/2017 | Luse et al. |
| 2017/0287112 A1 | 10/2017 | Stafford et al. |
| 2017/0343822 A1 | 11/2017 | Border et al. |

OTHER PUBLICATIONS

Cho, K. "Dive Deeper Into Your Data with Full Text Search Indexing", Feb. 9, 2016, available from <https://www.druva.com/blog/dive-deeper-into-your-data-with-full-text-search-indexing/>.

Deck, M. "Building and Maintaining an Amazon S3 Metadata Index without Servers", Aug. 12, 2015, available from <https://aws.amazon.com/blogs/big-data/b ilding-and-maintaining-an-amazon-s3metadata-index-without-servers/>.

European Patent Office, European Search Report and Opinion, European Patent Application No. 18202726.8, dated Feb. 20, 2019, ten pages.

Newsroom. "Druva Announces First-Ever Endpoint Data Protection to Address Federal Standards for Public Cloud", Dec. 15, 2015, available from https://web.archive.org/web/20160402073914/https://www.druva.com/abouUpressreleases/druva-announces-first-ever-endpoint-data-protection-to-address-federal-standards-for-public-cloud/.

Singh, J., "Encryption, Deduplication and Making Sense", Mar. 11, 2012 available from Khttps://www.druva.com/blog/encryption-deduplication-making-sense/>.

United States Office Action, U.S. Appl. No. 15/945,574, filed Feb. 6, 2020, 58 pages.

United States Office Action, U.S. Appl. No. 15/945,574, filed Aug. 21, 2020, 23 pages.

United States Office Action, U.S. Appl. No. 15/945,574, filed Mar. 2, 2021, 19 pages.

Vogels, W. "Amazon DynamoDB—a Fast and Scalable NoSQL Database Service Designed for Internet Scale Applications." Allthingsdistributed.com, Jan. 18, 2012, 5 pages, [Online] [Retrieved Aug. 10, 2020], Retrieved from the internet <URL:https://www.allthingsdistributed.com/2012/01/amazon-dynamodb.html>.

Zheng, Q. et al., "DeltaFS: Exascale file systems scale better without dedicated servers," Proceedings of the 10th Parallel Data Storage Workshop, ACM, Nov. 2015, pp. 1-6.

* cited by examiner

Creation 510

Deletion 520

Modification 530

DEDUPLICATED MERGED INDEXED OBJECT STORAGE FILE SYSTEM

CROSS REFERENCE TO RELATED APPLICATIONS

This is application is a division of U.S. application Ser. No. 16/171,010, filed Oct. 25, 2018, which claims benefits of, and priority to, India Patent Application No. 201741038018, filed Oct. 26, 2017, and India Patent Application No. 201841014685, filed Apr. 18, 2018. All of the abovementioned applications are incorporated by reference in their entirety herein.

TECHNICAL FIELD

This disclosure relates generally to data storage and indexing and, in particular, to constructing a deduplicated time-indexed file system implemented over object storage to store file data, merged index to store file system namespace, and distributed database to store deduplication index.

BACKGROUND

As the value and use of information continue to increase, individuals and businesses seek additional ways to process and store and search information. One option available to users is information handling systems. An information handling system generally processes, compiles, stores, searches and/or communicates information or data for business, personal, or other purposes thereby allowing users to take advantage of the value of the information.

Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems also need a mechanism to index and search the information stored. Storing information in a way that it can be indexed and searched easily and quickly is expensive. Prior art indexing systems use hard disk drives to store information and create an index that can be searched responsive to a search query. One shortcoming of the prior art indexing scheme is that it is difficult to scale. As the index grows, more storage space, e.g., hard disk drive space, is required. Moreover, storage devices such as hard disk drives typically have to be connected to a specific operating system of a computer. The hard disk drive and the computer must remain operational in order for the index to be updated or searched. It can be expensive to run the hard disk drive and the computer that are connected at all times. When additional duplicative computers are added, it could also be costly to manage the consistency among the computers. Further, as the index grows, more disk drive space is needed, resulting in the addition and management of more disk drives computers. This increases costs and operational complexity of keeping such systems up and running. Moreover, a failure in either the hard disk or the computer presents accessibility issues, which are further compounded as more hard disks and computers are added.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 is an example system environment a file system, in accordance with an embodiment.

DETAILED DESCRIPTION

Figure 1:
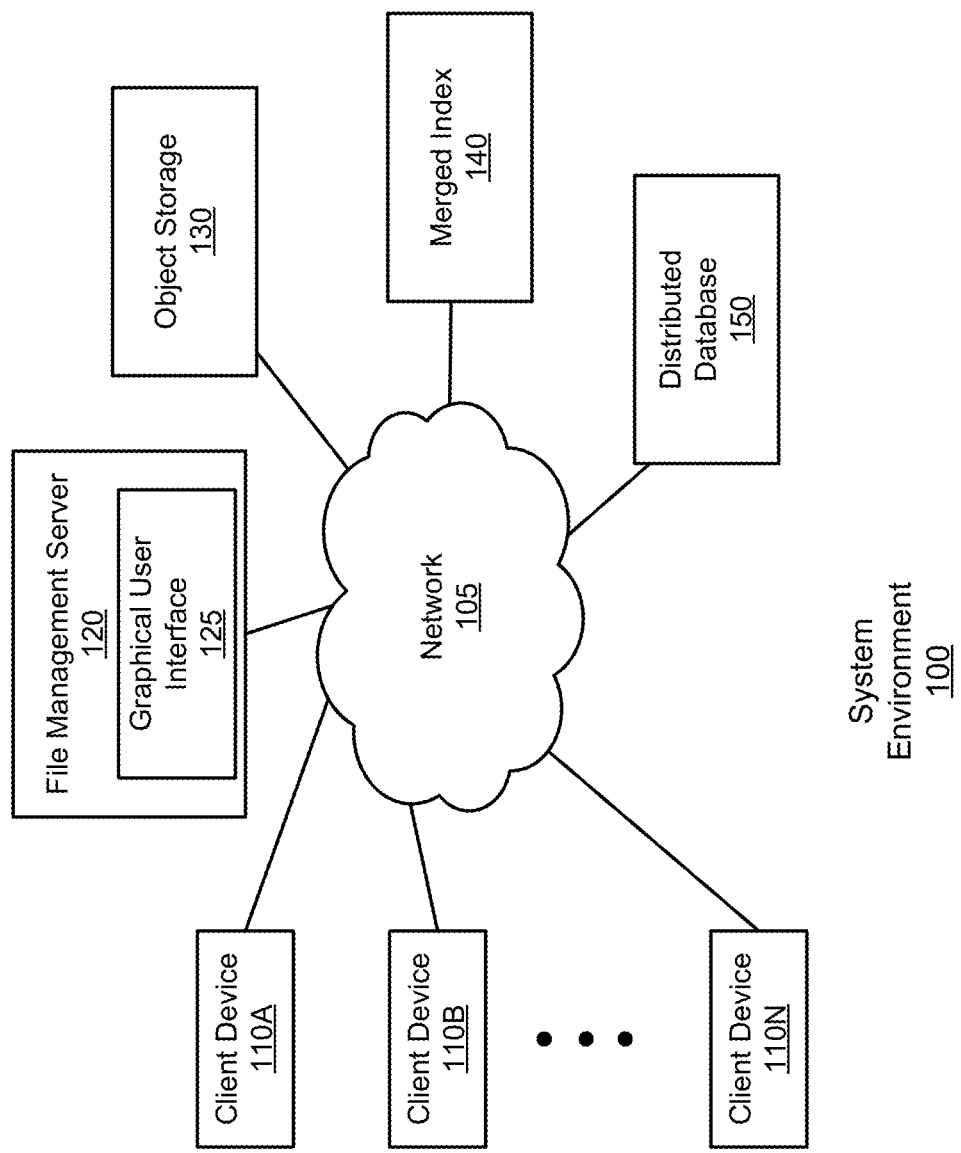

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments are systems, methods and/or computer program products (e.g., software and/or a non-transitory computer-readable storage media that stores instructions executable by one or more processing units) for constructing a file system with a merged index over object storage. One example application of the embodiments is to build a deduplicated time-indexed file system implemented over the merged index. The deduplicated time-indexed file system stores data in an object storage, deduplication information in a distributed database, and the namespace metadata in the merged index. Another example application is a full-text search index system for executing full-text searching. The full-text search application reads the data from object storage, obtains a word list from the data, and stores a full-text search index in the merged index. It is noted that the object storage may be random access or sequential.

The present disclosure relates in various example embodiments to devices, systems, methods, and instructions stored on one or more non-transitory computer-readable media involving a no-SQL index or merged index (which may be a special case of a key-value store). A plurality of objects is stored within an object storage. Each object comprises a plurality of key-value pairs. A plurality of pointers pointing from the merged index to the plurality of objects in the object storage may be created to monitor the active entries in the merged index.

In an indexing system, keys and associated values can be stored in a merged index that can be searched. One disadvantage of conventional indexing systems is that the index cannot be scaled easily. Besides requiring additional storage space, more server computers are required to be coordinated to deliver consistent data. Embodiments described herein overcome those limitations by using object storage. Object storage allows additional index entries to be created without overloading a specific server computer. Object storage also allows multiple computers to access the merged index simultaneously.

In an example embodiment, a distributed, cloud-based storage system provides a reliable, deduplicated, scalable and high-performance backup service to heterogeneous clients that connect to it via a communications network. The distributed cloud-based storage file system guarantees consistent and reliable data storage using structured storage. The presence of four components—atomicity, consistency, isolation, and durability—can help ensure that a database transaction is completed in a timely manner. Consistency and reliability are guaranteed using a system that includes: back references from shared objects to referring objects, safe orders of operation for object deletion and creation, and simultaneous access to shared resources through sub-resources. Object storage is often not tied to a particular operating system or a particular server. An object can be accessed directly by multiple computers. Hence, objects can easily be scaled for large data storages.

The backup storage disclosed herein combines the benefits and advantages of three different storage technologies. For example, object storage is used to store the backup data. A distributed database may be used to store deduplication indices. A merged index may be used to store namespace indices.

Distributed databases typically may be implemented on top of solid state devices, which have high access cost. In a distributed database, for every key search, a random read operation to the solid-state devices is potentially needed. Similarly, each store operation could potentially require a random write operation to the solid-state devices. Since random input-output operations are not supported efficiently by conventional hard disks, distributed databases often use solid state drives, which increases the operational cost of running such an index.

A backup file system using a distributed database often requires an entry per file. During a backup cycle, there is a need to add a large number of entries to a distributed index, each entry potentially resulting in random write operations and, hence, escalating operational cost. On the contrary, a merged index disclosed herein has low cost because a batch of add operations are stored as a single object with a single write operation to object storage. The storage cost of object storage, e.g., a hard disk, may be several times lower than that for a distributed database.

Example System Environment

Figure (FIG. 1 illustrates an example system environment 100, in accordance with an embodiment. The system environment 100 may include one or more client devices 110A, 110B, . . . , 110N, a file management server 120, an object storage 130, a merged index 140, and a distributed database 150. A client device 110 may send a request to read, search, add, delete, or modify data stored on a cloud environment via a front-end graphical user interface 125 provided and operated by the file management server 120 or via other suitable ways such as application program interfaces (APIs). Examples of data stored include, but are not limited to, a text file, an image file, an audio clip, a video clip, an email, or any combination thereof. The client devices 110 may be any computing devices that have data that may need backup. Examples of such client devices 110 include personal computers (PC), desktop computers, laptop computers, tablets, smartphone, wearable electronic devices such as smartwatches, or any other suitable electronic devices. The client devices 110 also may be server-type devices that may need backup, such as web servers, file servers, database servers, etc. The clients may be heterogeneous. For example, the clients may be of different natures such as including individual end users, organizations, businesses, webpage providers, servers, and other clients that use different types of clients devices that run on different operating systems. Although clients may be heterogeneous, from the point of view of the file management server 120, client devices 110 that may need data backup services may be treated in the same or a similar manner.

The file management server 120 may be a software or a hardware component (e.g., the computing machine of FIG. 11) that enables the client devices 110 to store and backup data and search and access the backup data. The file management server 120 may provide graphical user interfaces 125 for individual clients to access the server 120 for cloud data management. For example, a graphical user interface 125 may be a front-end cloud storage interface. Additionally, or alternatively, the file management server 120 may provide APIs for the access and management of files from the client devices 110. The file management server 120 also may mange, coordinate, and communicate with other system components such as the object storage 130, the merged index 140, and distributed database 150. Together, the file management server 120, the object storage 130, the merged index 140, and distributed database 150 may form a deduplicated time-indexed file system, which will be discussed in further details below in associated with FIG. 2.

The object storage 130 stores data in the object format in, for example, non-volatile memory. Example object storages 130 include AMAZON S3, RACKSPACE CLOUD FILES, AZURE BLOB STORAGE, GOOGLE CLOUD STORAGE. Object storage (also known as object-based storage) is a computer data storage architecture that manages data as objects, as opposed to other storage architectures like file storage which manages data as a file hierarchy and block storage which manages data as blocks within sectors and tracks. Each object typically may include the data of the object itself, a variable amount of metadata of the object, and a unique identifier that identifies the object. Unlike data files or data blocks, once an object is created, normally it could be difficult to change because the unique identifier of the object often is generated based on the underlying data (e.g., generated based on the checksum of the object). However, unlike file or blocks that often need an operating system of a computer to be accessed, objects may often be accessed directly from a data store and/or through API calls. This allows object storage to scale efficiently in light of various challenges in storing big data. The object storage 130 may store snapshots of backup of client devices 110 (as one or more objects for each snapshot) and merged index tables, which will be discussed in further details below in associated with FIG. 3. However, in some embodiments, snapshots of backup of client devices 110 are not stored in object formats. Instead, those snapshots may be stored file formats or block formats in another backup server (not shown in FIG. 1).

The merged index 140 may be used to store index information and/or metadata regarding data structure so that data can be retrieved efficiently. The merged index 140 may save namespace metadata in different namespace entries that will be discussed in further details below in associated with FIG. 4. A namespace entry may be an index entry for a file. Namespace metadata of a file may include file version, file name, creation version, deletion version, modification time, size, etc. Files here may also include emails. For an email, the metadata may be different from a regular file. The metadata of an email may include sender, recipient, subject line, copy list, etc.

The distributed database 150 is a distributed, often decentralized, system that distributes data among different nodes to provide better data access and operation in case of a failure or offline of one or more nodes. The distributed database 150 is often a NoSQL database server having non-volatile memory. Example distributed databases include AMAZON DYNAMODB and APACHE CASSANDRA. The distributed database 150 may be used in two contexts. First, the distributed database 150 may be used for data deduplication purpose. Checksums of backup data (e.g., snapshots) are created as the deduplication indices of the backup data. The deduplication indices may be stored in the distributed database 150. For more details about how the distributed database 150 operates with the deduplication indices, U.S. Pat. No. 8,996,467, patented on Mar. 31, 2015, entitled "Distributed Scalable Deduplicated Data Backup System" is incorporated herein by reference for all purposes.

Second, the distributed database 150 is used by the merged index 140 for bookkeeping, even though the merged index 140 may be saved in object format stored in the object storage 130. For example, the merged index 140 uses a distributed database 150 to generate object storage identifiers while processing a batch insert operation. The distributed database 150 may also use to store pointers of the objects of merged index 140. The pointers may point to active objects of the merged index 140. In one embodiment, the identification information may be used to map from the identifiers of the object store 130 to information (size, path, etc.) about the object. For example, identification reference may be used to map from the object store identifiers to list of reverse links to data that use the object. A path identifier may be used to map from data or folder path to the identifier. Identification path may be used to map from identifier to parent folder identifier and file name. All those identifiers and references may be stored in the distributed database 150.

In some embodiments, the first use of the distributed database 150 related to deduplication indices and the second use related to management of the merged index 140 may be carried out by the same distributed database 150. In other embodiments, the two uses may be carried out by different distributed databases 150.

The various components in the system environment 100 may be communicated through the network 105 and/or locally. For example, in some embodiments, the merged index 140 may be a local component that communicates locally with the file management server 120, while other components communicate with the file management server 120 through the networks. In other embodiments, every component in the system environment 100 is online and communicates with each other through the network 105. In one embodiment, the network 105 uses standard communications technologies and/or protocols. Thus, the network 105 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 105 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the file management server 120, the object storage 130, the merged index 140, and distributed database 150 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
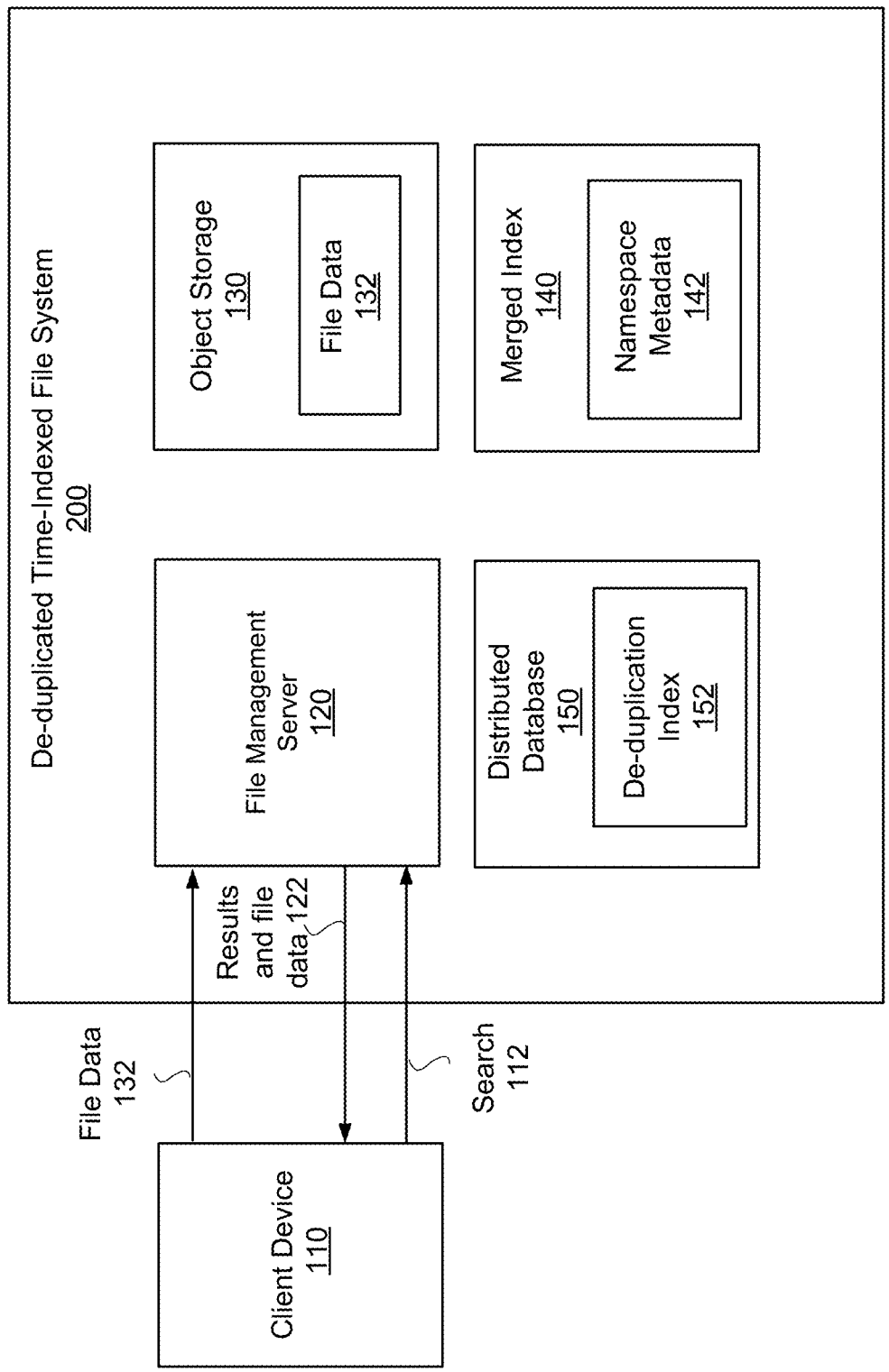
FIG. 2 is a block diagram illustrating an example deduplicated time-indexed file system, in accordance with an embodiment.

FIG. 2 shows a deduplicated time-indexed file system 200 (or referred to as the file system 200), in accordance with an embodiment. The file management server 120, the object storage 130, the merged index 140, and the distributed database 150, which communicate to each other through a network, collectively may form the file system 200. The system 200 in other embodiments may include additional or fewer components. For example, the system 200 may include additional backup storages which can be conventional data stores. The object storage 130 may also serve as the backup storage to store snapshots of data of client devices. The file management server 120 may serve as the front end of the file system 200 and communicate with the client device 110. The client device 110 may provide file data 132 to the file system 200 and retrieve the file data from the file system. The client device 110 may perform search 112 based on metadata of the data. In response, the file system 200 provides the results and file data 122 to the client device 110.

In the file system 200, file data 132 may be managed through different types of indices. File data 132 may take any suitable forms such as an individual file (e.g., a text file, a picture, a song, etc.) or a snapshot of data of a client device 110 (e.g., a backup snapshot of the storage drive of the client device 110). When the file management server 120 receives file data 132 from a client device, the file data 132 may be converted into objects and stored in the object storage 130. Deduplication index 152 of the received file data 132 may be stored in distributed database 150 while namespace metadata 142 of the same received file data 132 may be stored in merged index 140. The namespace metadata 142 of different file data 132 is sorted and grouped together in a batch to create an object that includes multiple namespace entries.

Deduplication index 152 is used to identify duplicated file data in order to reduce storage space occupied in the file system 200. When file data 132 is received, one or more checksums of the received file data 132 may be generated. Each checksum can be a hash that represents a unique fingerprint of the file data 132 or a portion of the file data 132. The checksum may be stored in distributed database 150 as deduplication index 152 so that, when other files or snapshots are uploaded to the file system 200, the checksums of those files or snapshots are compared against the deduplication index to determine whether identical data is already present in the file system 200. If a new checksum matches one of the deduplication index 152, the corresponding file data will not be saved in a data store such as the object storage 130. Instead, the file system 200 may generate a pointer that links the deduplication index 152 to the file so that the existing file data can be retrieved by the client device 110.

The merged index 140 and the namespace metadata 142 stored are used to manage and to locate the file data 132 saved in the file system 200. The namespace metadata 142 may include file name, creation version, deletion version, file location, etc. for the file management server 120 to locate and/or identify file data 132 stored in the file system 200. The merged index 140 is a form of a key-value store. As new file data is added based on key and value to the file system 200, the file data have the ability to be searched based on keys. Values may serve as the output in response to a search query.

The use of different indices to manage file data improves the efficiency and speed of the file system 200. The distributed database 150 is often a random access data store. Since deduplication indices 152 are often not logically related to other deduplication indices 152, a random access data store provides a better performance in this scenario. In contrast, the key-value pairs in the merged index 140 may be serialized. Since the accesses of file data are often related to the namespace metadata of other related file data in the locality, a serialized system provides an improvement over efficiency and speed of the file system 200. Retrieving multiple key-value pairs in a serialized order can be performed with low cost using the merged index 140.

In addition, the use of object storage to store index entries provides various advantages including allowing the file system 200 to scale more efficiently. Contrary to block storage which usually can only be accessed when the blocks are attached to an operating system, objects can be accessed directly by multiple computers and/or through APIs. Hence, different workers of the file system 200 may access the entries in the merged index 140 directly, thus further increasing the operational speed of the file system 200. This also improves the scalability issue of the file system by avoiding the consistency and overloading of conventional indexing engines when too many computers are connected to an indexing engine. In addition, because multiple users may access the merged index 140 simultaneously, a client device 110 also may establish multiple connections to the file management server 120. In turn, this may increase backup speed. The namespace entries created in parallel connections can subsequently be handled by one or more merge operations, which will be discussed in further detail below with FIG. 6.

In some embodiments, since the merged index 140 may use object storage, the merged index 140 may have different characteristics as compared to a conventional indexing engine that may be optimized for random access. In one embodiment, the merged index 140 may handle additions of new entries in batches. Data is flushed to persistent storage after finishing a batch. In one embodiment, the merged index 140 may be optimized for sequential reads for search requests with good locality of reference. In one embodiment, the merged index 140 does not support update and delete operations, but addition and search operations are supported. This is a non-routine and unconventional use of object storage as an index system because objects are often very difficult to be changed once created but index entries of an index system often need to be changed frequently.

In some cases, the file system namespace metadata 142 may use integer identifiers (instead of file paths) if a file is referred to frequently. For example, a large file may be backed up as a collection of blocks. Each block is stored in a separate object and the block offset is mapped to the object storage identifier. A reverse link from the deduplication index 152 stores a back reference to the file and offset. Note that as a large file can include millions of blocks and each block may need a reverse link, the length of a reverse link may be reduced when an integer identifier is used. For small files, a reserve link may take the form of a file path that may include the parent folder identifier and file name. Identifiers may be generated for folders and large files.

Merged Index Hierarchy and Structure

Entries in the merged index 140 may be stored in objects that are arranged in a plurality of hierarchical tables that may be referred to as S3Tables. Each merged index 140 includes a plurality of S3Tables, which may be created by different workers of the file system 200 and/or at different times.

Figure 3:
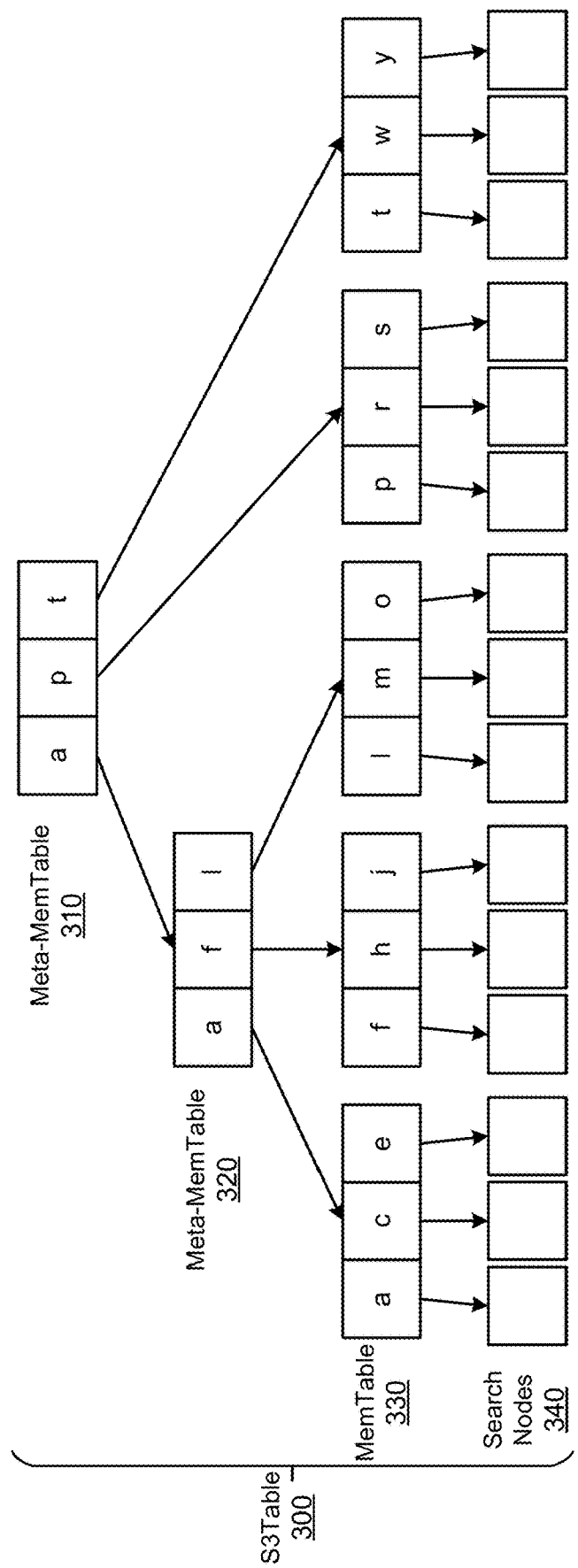
FIG. 3 is a conceptual diagram illustrating the hierarchy and structure of an example S3Table, in accordance with an embodiment.

FIG. 3 is a block diagram depicting the hierarchy and structure of an example hierarchical table, in accordance with an example embodiment. FIG. 3 shows an example B+ tree structure, although other hierarchy structure such as B tree, hash table, or a merge tree may be used. The S3Table 300 may be a serialized tree structure that may include a plurality of layers (e.g., four layers (310, 310, 330, 340) in this example). The upper layers (e.g., 310, 320) include internal nodes (branch nodes) that have child nodes. Each interal node in the S3Table 300 may be referred to as a meta-MemTable, for example, Meta-MemTables 310 and 320. The lowest layer of the S3Table 300 includes leaf nodes that may be referred to as MemTables 330. The MemTable 330 may include one or more search nodes 340. A search node 340 may include a plurality of key-value pairs, which will be discussed in details in associated with FIG. 4. Each MemTable 330 and meta-MemTable 310, 320 may be stored as an object that is stored in the object store 130. The entries in the MemTables 330 are sorted. For example, the MemTables 330 and meta-MemTables 310 and 320 include alphabets that are sorted. A MemTable 330 may include a sorted list of entries of key-value pairs while a Meta-MemTable 310, 320 may include a sorted list of lists of entries that are used to organize the leaf node MemTables 330. The leaf node of an S3Table may be called a MemTable because a MemTable is small enough to fit in memory and does not deal with persistence directly.

The alphabet notations shown in FIG. 3 are merely for the illustration purpose only to show the hierarchy and arrangement of an S3Table. The entries in the S3Table 300 may be sorted in any suitable manners (e.g., by bits, numerically, alphabetically, etc.). Also, an S3Table may include additional or fewer layers. Furthermore, the S3Table 300 may include only a single MemTable (e.g., a single object).

The merged index 140 operates in batches. When a new data file is received in file system 200, a new namespace entry associated with the new data file is normally not immediately saved persistently to a data store. Instead, multiple updates to the merged index 140 are treated in batches. The new namespace entries (e.g., new key-value pairs) are first stored temporarily in memory (e.g., a buffer memory) before the MemTable grows to a sufficient size and is flushed to a more permanent storage (e.g., a non-volatile storage). For example, in a flush process, when the MemTable is sufficiently large, the MemTable is converted to an object that is saved in the object store 130. As a result, the namespace entries belonging to the same batch may be stored in a single object, or two or more related serialized objects if the batch has more entries than an object can include. A sorted and hierarchical table S3Table defines the relationship among sorted MemTables that are saved persistently. A batch of updates may be processed and persisted by the merged index 140 in an S3Table that includes one or more objects. The next batch of entries may go to a new S3Table that includes other objects and so on. Since merged index 140 are created in batches, multiple S3Tables may be formed for files that are uploaded at different times. Periodically, the merged index 140 performs a merge operation of S3Tables to consolidate the entries in different S3Tables. Hence, in response to a search request, the number of S3Tables that need to be loaded can be reduced and the search speed is improved. The merge operations may be performed in the background while the merged index 140 is operating. The details of the merge operation will be further discussed in associated with FIGS. 6 and 7.

A client device 110 can establish multiple connections with the file system 200 to backup different files or different data blocks of a file in parallel for faster backup speed. The namespace entries created through different connections are stored in different indices within the merged index 140. The different indices subsequently may be merged or stored serially much like data files that are uploaded at different times. Alternatively, a batch of operations may be built in-core. This second mode of operations may be used when backing up cloud-based applications or apps such as GOOGLE GMAIL, MICROSOFT EXCHANGE ONLINE, MICROSOFT SHAREPOINT, etc. The second mode of operation can also be used by a client device 110 by assembling a batch and sending it as a single operation to the backup server 100.

The number of objects included in a single S3Table created in a batch depends on the number of entries. When there are too many entries (e.g., too many key-value pairs) for an object to contain, additional leaf node MemTables may be created and one or more Meta-MemTables are used to describes the relationships among the leaf node MemTables. In some cases, a MemTable may grow large and may be split. For example, a predefined memory size is used to limit the size of a MemTable that can be written to the object storage 130. For example, in one particular embodiment, the memory size limit is 8 MB. When a MemTable is split into two or more, a new level of meta-MemTable may be created that maps the key in the leaf node MemTables.

Since the entries in an S3Table 300 are sorted, a search of an entry may be conducted through traversing the tree structure of the S3Table until a search node 340 in a leaf node MemTable 330 is reached. The search operation may start from a Meta-MemTable at the top level, which points to other Meta-MemTables in intermediate level(s) (if any). One of root MemTables are loaded. If the next lower level MemTable is not a leaf level, the entry in this Meta-MemTable is searched to find the next lower level MemTable. Based on the sorting of the S3Table table, eventually a leaf node MemTable 330 is reached and a particular entry of key-value pair can be reached.

The merged index 140 may include multiple S3Tables 300. A collection of S3Table 300 may be referred to as full-text index (FTI). Each S3Table covers an entire keyspace, but different S3Tables may be created at different times based on the batch operation of the merged index 140. To search a particular entry, oftentimes all S3Tables may need to be searched to find the particular entry, although, within a particular S3Table, it may be sufficient to look at only the MemTable that has keys in the range that cover the particular entry.

Each S3Table may be associated with an anchor object. Anchor objects list the S3Tables that are active. Each anchor object may include a pointer that points to a S3Table. A collection of the pointers may be considered the map of the merged index 140 and may be saved in the distributed database 150.

Search Nodes

Figure 4:
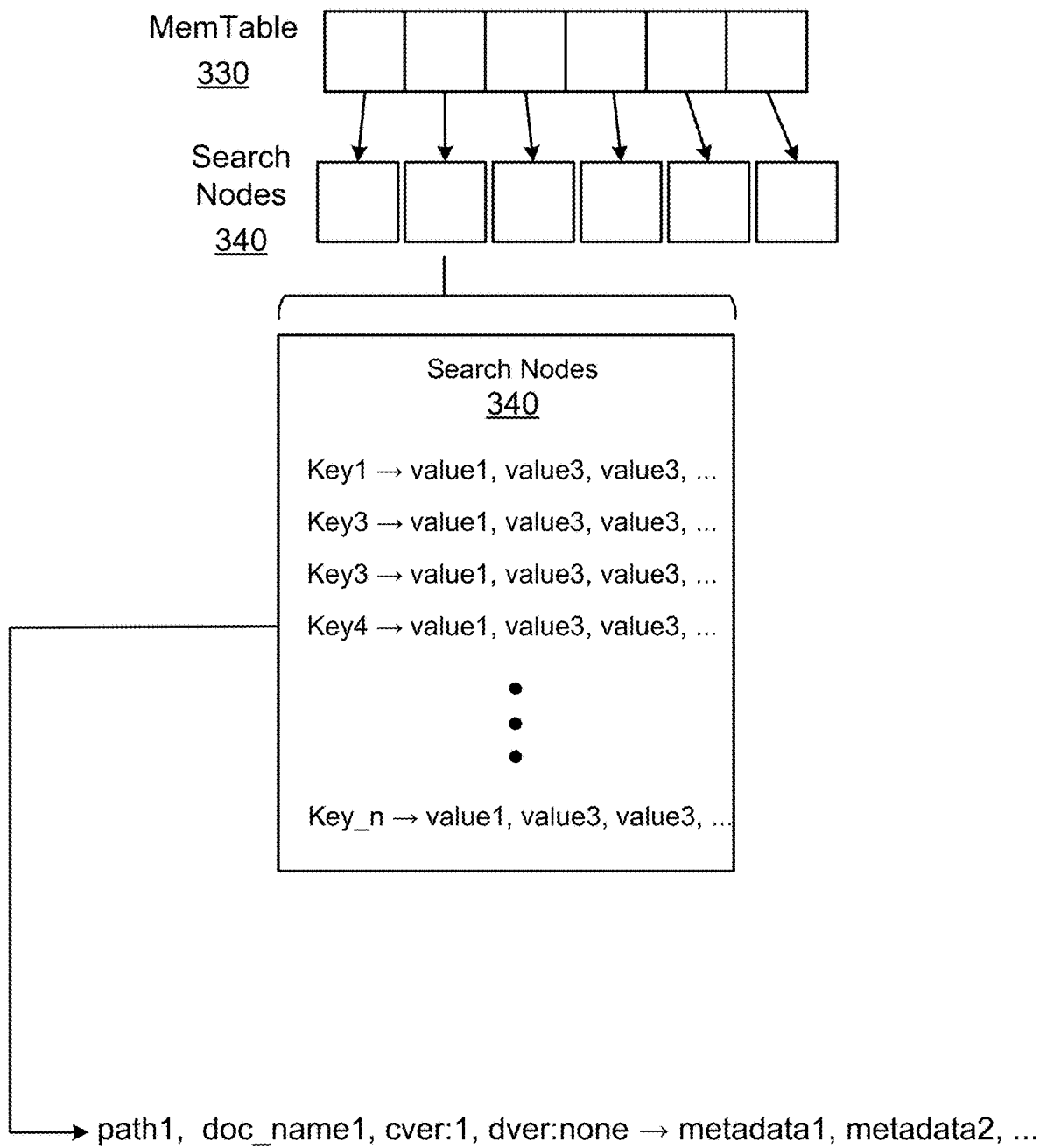
FIG. 4 is a conceptual diagram illustrating the structure of a MemTable, in accordance with an embodiment.

FIG. 4 shows a visual representation of the structure of a MemTable 330 and search nodes 340 included in the MemTable 330, in accordance with an example embodiment. While each of the MemTables 330 in FIG. 3 is shown as having three search nodes 340, this specific number of search nodes 340 is merely an example. A MemTable 330 may include any number of search nodes 340. For example, the example MemTable 330 in FIG. 4 includes six search nodes 340. A MemTable 330 may be stored as an object in object store 130. A MemTable 330 may be an array of search nodes 340 and include the start and end terms of the search nodes 340 and pointers (represented by the arrows) to the search node 340. If the number of search nodes 340 exceeds the array limit of a MemTable 330, a new MemTable 330 is initiated and a Meta-MemTable (shown in FIG. 3) is added to point to the leaf node MemTables 330.

Each search node 340 may be a sorted list of key-value pairs sorted on keys. Each key-value pair includes a unique key and one or more values associated with the key. The merged index 140 may be used for multiple purposes. How the keys in a search node are created may depend on how the merged index 140 is used.

In one implementation, the merged index 140 may be used to manage file data stored in object store 130. In such implementation, the key-value pairs in a search node 340 may also be referred to as namespace entries for file data 132. A key in a namespace entry may be formed by multiple parts. For example, a key may be divided into three parts, which may be a group part, a term part, and a document-identifier part. A group part may be used for entries in the merged index 140 to be ordered by group as the major key. A term part may be used to sort namespace entries for a given group. A document-identifier part may be used to sort entries for a given group-term. How a group and a term is classified may depend on the implementation and the file structure. For example, files in a folder may be stored with group=identifier of the folder, term=file name, and document identifier=creation version (cver) and deletion version (dyer). For example, in one case shown in the bottom of FIG. 4, a key may include path1, which identifies the folder, a file name doc name1, a creation version (cver) that is associated with a particular version of a snapshot, a deletion version (dyer) that is associated with another version of a snapshot.

Alternatively, in one embodiment, the creation versions and the deletion versions may be saved in the value of key-value pairs. In some cases, if a file has never been deleted or modified, dyer may be associated with "none." The values in the key-value pair namespace entry may be the namespace metadata of the file, such as the file size, modification time, access control, etc. For smaller files, the metadata may also contain the data block identifier. If a data block includes data from multiple files, the metadata may also include offset within the block.

There can be different types of namespace entries stored in the merged index 140. For example, in one embodiment, three types of entries are used. First, a folder type may use a folder identifier as the group part of the key, a child name as the term part, and cver and dyer as the document-identifier part. This type of entries can be used to list files in a folder. File data 132 may be stored as objects in object store 130. Two additional types of namespace entries are used in associated with the objects. First, a multi-block map type may use a file identifier as the group part of the key, an offset as the term part, and cver and dyer as the document-identifier part. This type of entries may be used to list all data blocks in a file. Second, a block-pack map type may use an object identifier as the group part of the key, a folder identifier and file name as the term part, and cver and dyer as the document-identifier part. This type of entries may be used to list all files that refer to object identifier for a data block. The value of the last two types of key-value pair namespace entries may include object storage identifier.

In another implementation, the entries in the merged index 140 may be index entries of files for search purposes. For example, a search node 340 may include a sorted list of terms and the associated metadata such as the file identifier list of all documents that contain the term, the fieldname where the term occurs, the frequency of occurrence, and so on. The search terms are saved in a serialized manner and can be located based on searching through different S3Tables.

Update and Change of Files

Figure 5:
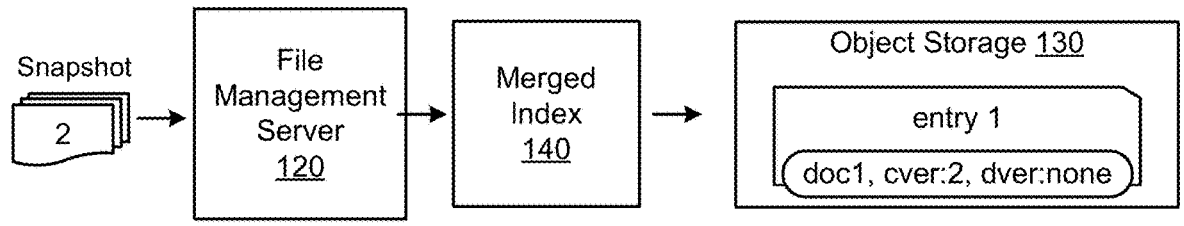
FIG. 5 are conceptual diagrams illustrating example creation, deletion and modification operations of a file namespace entry in a merged index, in accordance with an embodiment.
Figure 5:
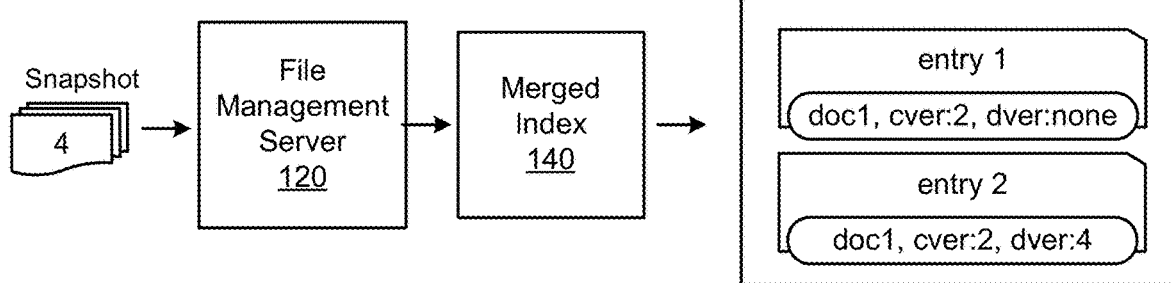
Figure 5:
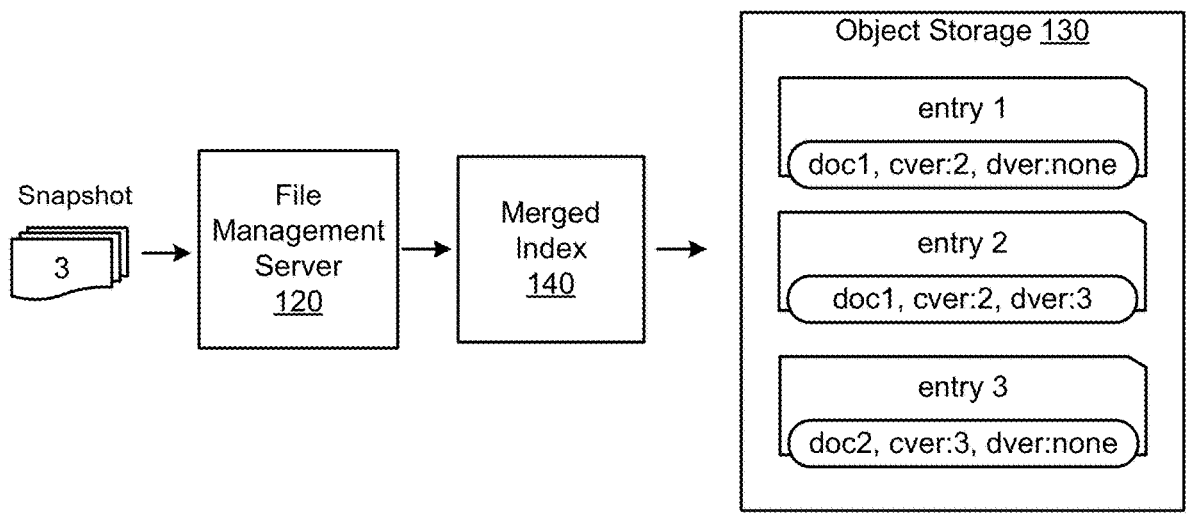

FIG. 5 is a conceptual diagram showing example operations in association with recording the creation, deletion, and modification of one or more files, in accordance with an embodiment. The processes shown in FIG. 5 can be used for files and folders. For simplicity, files are described in associated with FIG. 5, but folders may also be processed substantially in the same way.

The file system 200 may use snapshotting to provide different views of the source data as the data existed in different snapshots. In some embodiments, since the merged index 140 may use object storage whose objects are often difficult to be changed, the merged index 140 may not support updating an entry that has a value change (such as a metadata change) for an existing key. Hence, when the values of a namespace entry need to be updated to reflect changes captured in new snapshots, the merged index 140 does not simply change the values of a namespace entry because such operation is normally not supported. Instead, the merged index 140 creates a new entry in the merged index 140, such as creating a new key-value pair in a search node of a new MemTable that is going to be organized in an S3Table. A version identifier is added to each namespace entry to identify the latest entry. When a group of new entries is accumulated, a MemTable is flushed as an object in a batch.

A creation process 510 is a process to record a creation of a file, such as a creation captured in a snapshot. For instance, a client device 110 may create a file. The creation is captured in a snapshot #2. The snapshot #2 is sent to the file management server 120. The file management server 120 analyzes the snapshot #2 and identifies the new file created in the snapshot #2. In response, the file management server 120 causes the merged index 140 to create a new namespace entry associated with the new file. In a batch, the new namespace entry may first be stored in a MemTable in a memory before the MemTable is flushed to an object. The file management server 120 may also create a checksum of the new file and store the checksum as a deduplication index 152 in distributed database 150.

After the new namespace entry is flushed to an object, the object storage 130 will include a new namespace entry 1. In one embodiment, the entry 1 may be a key-value pair with a key that is formed by a file identifier, such as doc1, creation version (cver), and a deletion version (dyer). In one embodiment, the file identifier may include a group part and a term part, but for illustration purpose the file identifier in FIG. 5 is simply shown as doc1. Also, for simplicity, the value of the entry as a key-value pair is not shown in FIG. 5. The namespace entry 1 may include a creation version that has a value "2." This means the creation of the file corresponding to the namespace entry 1 is captured in the snapshot #2. The namespace entry 1 also may include a deletion version that has a value "none." This means that currently no snapshot has captured a deletion of the file that corresponds to the namespace entry 1.

A deletion process 520 is a process to record a deletion of a file, which may be captured in a snapshot. For instance, a client device 110 may delete the file created in the creation process 510. The deletion is captured in a snapshot #4. The snapshot #4 is sent to the file management server 120. The file management server 120 analyzes the snapshot #4 and identifies that the file is deleted in the snapshot #4. In response, the file management server 120 causes the merged index 140 to create a new namespace entry associated with the deletion, instead of modifying the existing namespace entry. A new entry is created because the merged index 140 normally does not support a change to the existing entries. In a batch, the new namespace entry recording the deletion may first be stored in a MemTable in a memory before the MemTable in flushed to an object.

After the new namespace entry is flushed into an object, the object storage 130 will include a new namespace entry 2. The namespace entry 1 that reflects the older snapshot still persists in the object storage 130. In one embodiment, the namespace entry 2 may include a file identifier doc1, which is the same as the file identifier of the namespace entry 1. The namespace entry 2 may also include a creation version 2, which means the creation of the file corresponding to the namespace entry 1 was captured in snapshot #2, consistent with the information in the namespace entry 1. The namespace entry 2 also may include a deletion version that has a value 4. This is different from the namespace entry 1 and reflects that the deletion of the file is newly captured in the snapshot #4.

A modification process 530 is a process to record a modification of a file, which also may be captured in a snapshot. For instance, assume that the file created in the creation process 510 is not deleted in snapshot #4, but instead is modified in snapshot #3. The merged index 140 may treat the modification as a deletion of an old version and a creation of a new version of the file. Hence, after the MemTables are flushed, the object storage 130 may now include three namespace entries. The first entry 1 was stored in the object 130 when the creation of the old version of the file (identified as doc1) was captured in snapshot #2. Two new entries 2 and 3 (which could be flushed from the same MemTable or different MemTables) are added. The new entry 2 may include a file identifier doc1, a creation version having a value associated with the snapshot #2, and a deletion version having a value associated with the snapshot #3. This new entry 2 reflects that the old version of the file is deleted (i.e. the file is modified) as of snapshot #3. The new entry 3 may include a file identifier doc2, which indicates that the file has a new version. The new entry 3 also may include a creation version having a value associated with the snapshot #3, which reflects that the new version of the file is created (i.e. the file is modified) as of snapshot #3. The new entry 3 also may include a deletion version having a value "none," because the new version of the file is newly created.

When a file is searched with respect to a particular snapshot, the merged index 140 may combine the namespace entries associated with the file on the fly. For example, if a file that has been deleted is searched with respect to a particular snapshot, two entries as shown in process 520 may be associated with the file. The merged index 140 combines the two entries and determines that the file has been deleted as of the particular snapshot, the file system 200 hence may return an appropriate response based on the combination of the entries. For example, in a listing operation that requests the listing of files in a snapshot such as the snapshot #4, since version 1 of the file is deleted in snapshot #4 or modified in snapshot #3, the file system 200 will output the doc2 version of the file but not the doc1 version of the file.

Versioned and Unversioned Message Storage

Besides storing regular files, the file system additionally, or alternatively, may be used as the message store to store such as email messages. The message store provides versioned as well as unversioned storage. For versioned storage, point-in-time snapshots are provided of data being backed up. For example, a message store "Mails" may contain "email1" when a backup is run on Monday. The message store may contain "email2" when a backup is run on Tuesday. The message store presents two snapshots of the backup storage, one that shows "email1" in "Mails" and, a second that shows "email2." The merged index 140 achieves this by making a creation version and a deletion version on each entry. On Monday, the merged index 140 may contain a single entry ("email1" cver=1 dver=none). After Tuesday backup, the merged index 140 creates a first new entry ("email1" cver=1 dver=2) and a second new entry ("email2" cver=2 dver=none). A search for "email1" returns both entries related to the "email1." The merged index combines those two entries on the fly and returns the result based on the combination.

Depending on the snapshot that is being considered, the merged index 140 may drop entries that are not relevant to a snapshot when a snapshot is called to be listed. For example, ("email1" cver=1 dver=none) is dropped when looking at Tuesday's snapshot (because the entry is deleted in version 2, that is, Tuesday snapshot). When the merged index 140 merges two or more indexes, it calls back into the file system to filter the entries written to the merged index. If the file system identifies two entries for the same key (one with dver=none and another with dyer that is not associated with none), the file system may pass only one entry (the entry with dyer that is not associated with none) as a search result.

For unversioned storage of messages, a single view of the messages is provided. For example, a message store "Mails" may contain a message "email1" when a backup is run on Monday and "email2" when another backup is run on Tuesday. The merged index 140 may present both "email1" and "email2" inside "Mails." A certain attribute "x" of "email2" may have a value "y" when the backup is run on Tuesday and value "z" when the backup is run on Wednesday. The merged index 140 may present "Mails" with "email1" and "email2" with attribute "x" with value "z". The merged index 140 will have 4 entries: "email1 cver=1 dver=None", "email2 cver=1 dver=None", "email2 cver=1 dver=2", "email2 cver=2 dver=None". The latest copy of any message can be presented by comparing all entries. The unversioned storage can be used for archiving purpose.

In an archive, retention may be time-based for both versioned and unversioned storage. A message with a creation/modified time older than the retention period may be deleted. For example, if the retention period is 7 years, messages older than 7 years may be deleted and will not feature in a snapshot view even though they are present at the source. In a merge operation, if the entry that has a creation/modification time older than the retention period, the merged index 140 will drop such entries.

For a versioned store, if there exists a message, for example, email 1 that is created at Version 1 and deleted at Version 2, the message can have two entries in the merged index 140 (email1, cver=1 dver=None) and (email1, cver=1, dver=2). During a merge operation, if the second entry (email1, cver=1 dver=2) comes first and is dropped from the merged index 140, the message may appear while listing the snapshot at Version 3. To avoid such scenario, messages older than the retention period may be ignored during listing. Hence, the order of deletion of entries associated with a message does not make a difference.

For an unversioned store, if a message "email1" is created and later modified, the merged index 140 may have 3 entries associated with the message: "email1 cver=1 dver=None," "email1 cver=1, dver=2," and "email1 cver=2, dver=None." During a merge operation, if "email1 cver=2 dver=None" comes first and is deleted, a wrong view of the message may be presented. Hence, messages older than the retention period may be ignored during listing.

When a message is dropped, the references of this message to the objects in the object store 130 may be deleted. Any objects not referenced by any of the messages can be permanently deleted from the object store.

Merging of S3Tables

Figure 6:
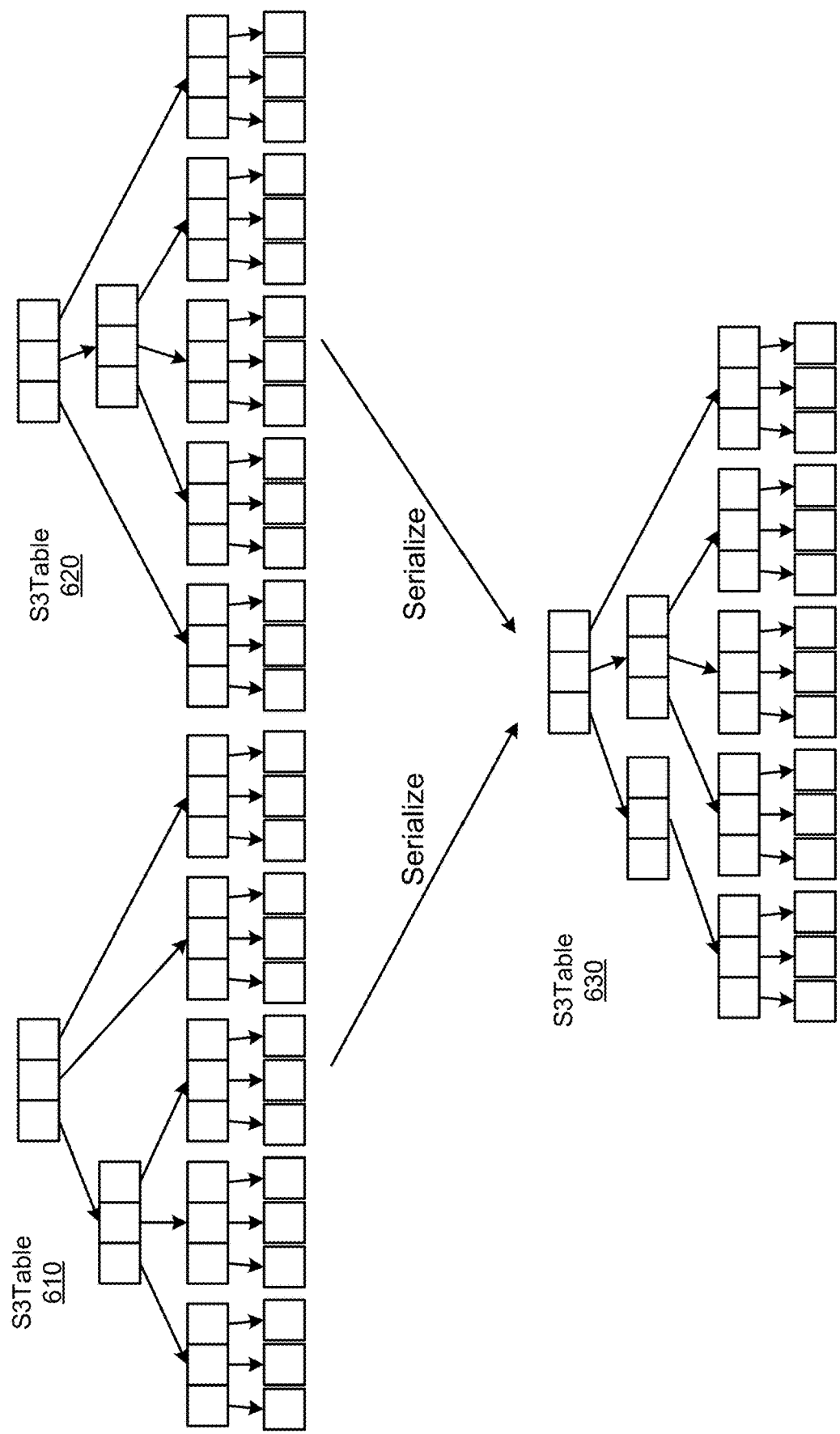
FIG. 6 is a conceptual diagram illustrating a merging of multiple S3Tables, in accordance with an embodiment.

FIG. 6 is a conceptual diagram showing a merging operation of two or more S3Tables into a single S3Table, in accordance with an example embodiment. Merging operation is often desirable for multiple reasons. First, to allow storage of a large amount of indices, the merged index 140 may be collectively operated by more than one computers. For example, the file management server 120 may include a plurality of distributed worker computers that operate independently. In addition, each worker computer may also create different S3Tables at different times. The use of multiple worker computers allows the storage and access of data from object storage 130 and merged index 140 to be performed by different worker computers simultaneously. This avoids a downtime of a particular computer affecting the operation of the whole file system 200. In one embodiment, the creation of entries in merged index 140 may also be done simultaneously by two worker computers. For example, when entries with keys K1, K4, and K6 need to be entered into the merged index 140, the same entry may be processed by two or more computers. For example, K1 may be processed by a first computer and a second computer, K4 may be processed by the second computer and a third computer, and K6 may be processed by the first computer and the third computer. Hence, a MemTable generated by the first computer may include K1 and K6, a MemTable generated by the second computer may include K1 and K4, and a MemTable generated by the third computer may include K4 and K6. There may be duplicate entries generated as a result. This is contrary to a conventional approach where a single computer is responsible for processing a new entry. In the merged index 140, multiple S3Tables that may include one or more entries that are duplicative with the entries in other S3Tables are generated. Furthermore, since the merged index 140 often does not support a modification of entries stored in objects, as data are created, deleted, modified, the number of objects created may increase significantly.

In one embodiment, the S3Tables, which includes multiple MemTable objects, are merged in the background to save space and to reduce the computational effort needed to locate an entry. When there are multiple S3Tables, a search of metadata of a file requires the loading of existing S3Tables and traversing of the B+ tree or similar hierarchy of each S3Tables to locate all related namespace entries that are stored in different objects (due to the objects being created in different batches and/or the objects being created by different computers). To reduce the operation speed to locate all entries related to a file, the merged index 140 may periodically perform the merge operations of S3Tables in the background to reduce the number of S3Tables and MemTables.

The merge operation of S3Tables is a serialized operation. For example, when two or more S3Tables such as S3Tables 610 and 620 are merged, the entries in the leaf nodes of the S3Tables 610 and 620 are sorted (serialized). One or more new MemTables are generated, depending on the total number of entries. Among the entries, merge and compaction operations of the entries also may be performed when generating the new MemTables. The merge and compaction operations of the entries will be discussed in further details below in associated with FIG. 7. After new leaf node MemTables are created, one or more Meta-MemTables may also be created and a new S3Table 630 is formed. A new anchor object may be associated with the newly created S3Table 630. The original anchor object entries that include the pointers pointing to the S3Tables 610 and 620 may be updated or deleted to indicate that those S3Tables are no longer active. The new S3Table 630 is used in place of the two old S3Tables 610 and 620. The total number of entries in the new S3Table 630 should be lower than the total number of entries in the old S3Tables due to some duplicative entries in the old S3Tables and also due to the merge and compaction operations. The merging of various S3Tables may be conducted periodically and/or when a number of S3Tables reaches a predetermined threshold.

Since there can be multiple S3Tables, all S3Tables need to be searched in order to search an entry. A map can be used to map the MemTables and S3Tables. The map may take the form of anchor object entries. The map information that points to active MemTables and Meta-MemTables may be stored in a distributed database such as the distributed database 150. The distributed database can be updated as merging of S3Tables occur. Pointers can be used to point from entries in the distributed databases to entries, objects, MemTables, and S3Tables in the object storage 130.

Merge and Compaction of Entries

Figure 7:
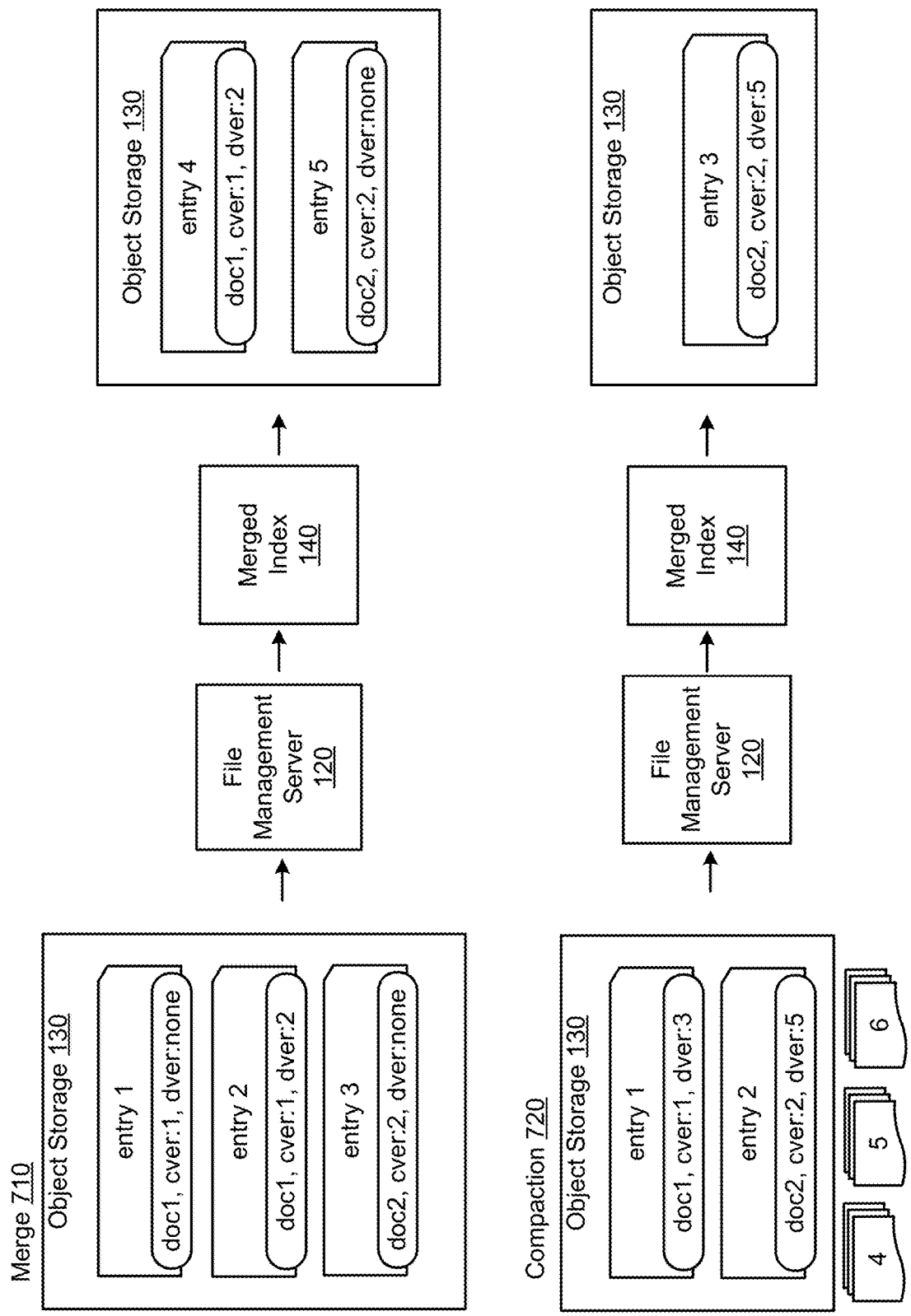
FIG. 7 are conceptual diagrams illustrating example merging and compaction operations of a merged index, in accordance with an embodiment.

FIG. 7 is a conceptual diagram showing a merge operation and a compaction operation that may be performed during merging of multiple S3Tables, in accordance with an example embodiment. Process 710 is an example merge operation of multiple entries, in accordance with an embodiment. When multiple S3Tables and/or MemTables are merged, all namespace entries in those tables are loaded and sorted. The merge operation of entries is used to eliminate redundant entries. The merging operation of entries includes accessing a plurality of namespace entries that are associated with the same particular file. The merged index 140 then creates a merged entry that has a creation version selected from one of the plurality of entries and a deletion version selected from another of the plurality of entries. Specifically, when a plurality of entries are associated with the same file version, the creation version and the deletion version of the merged entry may be selected chronologically based on the versions of those various entries. The creation version may be selected based on an entry that has the earliest creation version while the deletion version may be selected based on an entry that has the latest deletion version.

For example, referring to FIG. 7, a file having two versions is associated with three entries: entry 1, entry 2, and entry 3. Entry 1 and Entry 2 are associated with the same file version doc1 while entry 3 is associated with a different file version doc2. Entry 1 and entry 2 may be treated as being associated with the same particular file but not entry 3 because entry 3 is associated with a different version. In the merge operation, since the earliest creation version is version 1, version 1 is selected as the creation version of the merged entry 4. A new entry 4 is created (instead of modifying entry 1 or 2) because the merged index often does not support modification and also because a new S3Table is being generated. For the deletion version, entry 1 is associated with no deletion version while entry 2 is associated with version 2. Hence, version 2 is selected as the deletion version in the new entry 4.

The doc2 version of the file is associated with only entry 3. Since a new S3Table is being generated, a new entry 5 that copies all of the data from the entry 3 is created. As a result, new entry 4 and new entry 5 are generated in the new S3Table. The total number of entries is reduced as a result of the merge operation.

Process 720 is an example compaction operation of multiple entries, in accordance with an embodiment. When multiple S3Tables and/or MemTables are merged, all namespace entries in those tables are loaded and sorted. The compaction operation compares the entries with currently active snapshots and removes entries that are no longer associated with any of the active snapshots. A snapshot may be deleted and, thus, is no longer active. The compaction operation of entries includes accessing a plurality of namespace entries that are associated with a file. The merged index 140 then compares the creation and deletion version of an entry to the active snapshots to determine whether the entry is associated with an active snapshot. For example, the merge index 140 may load a plurality of entries that are associated with a file and determine the latest deletion version of the file. In response to the latest deletion version being preceding the earliest active version of the snapshot, the merged index 140 removes the entries and generate no entry to the new S3Table being generated.

By way of example, referring to FIG. 7, a file having two versions is associated with two entries: entry 1 and entry 2. Entry 1 is associated with the file version doc1 while entry 2 is associated with the file version doc2. In the compaction operation, since entry 1 is associated with a deletion version 3 while the earliest active snapshot is snapshot #4, entry 1 is no longer referenced in any active snapshots. As a result, entry 1 is not copied to the new S3Table and no entry associated with doc1 is generated in the new S3Table. While the example in FIG. 7 shows that the file version doc1 is associated with only one entry, in some cases multiple entries may be removed when the entries' deletion versions all precedes the active snapshots.

In contrast, entry 2 indicates that file version doc2 is created at snapshot #2 and deleted at snapshot #5. Hence, doc2 remains an active file in the snapshot #4, which is an active snapshot. As a result, data in the entry 2 is copied to the object storage 130 and a new entry 3 is generated in the new S3Table.

Exemplary Processes

Figure 8:
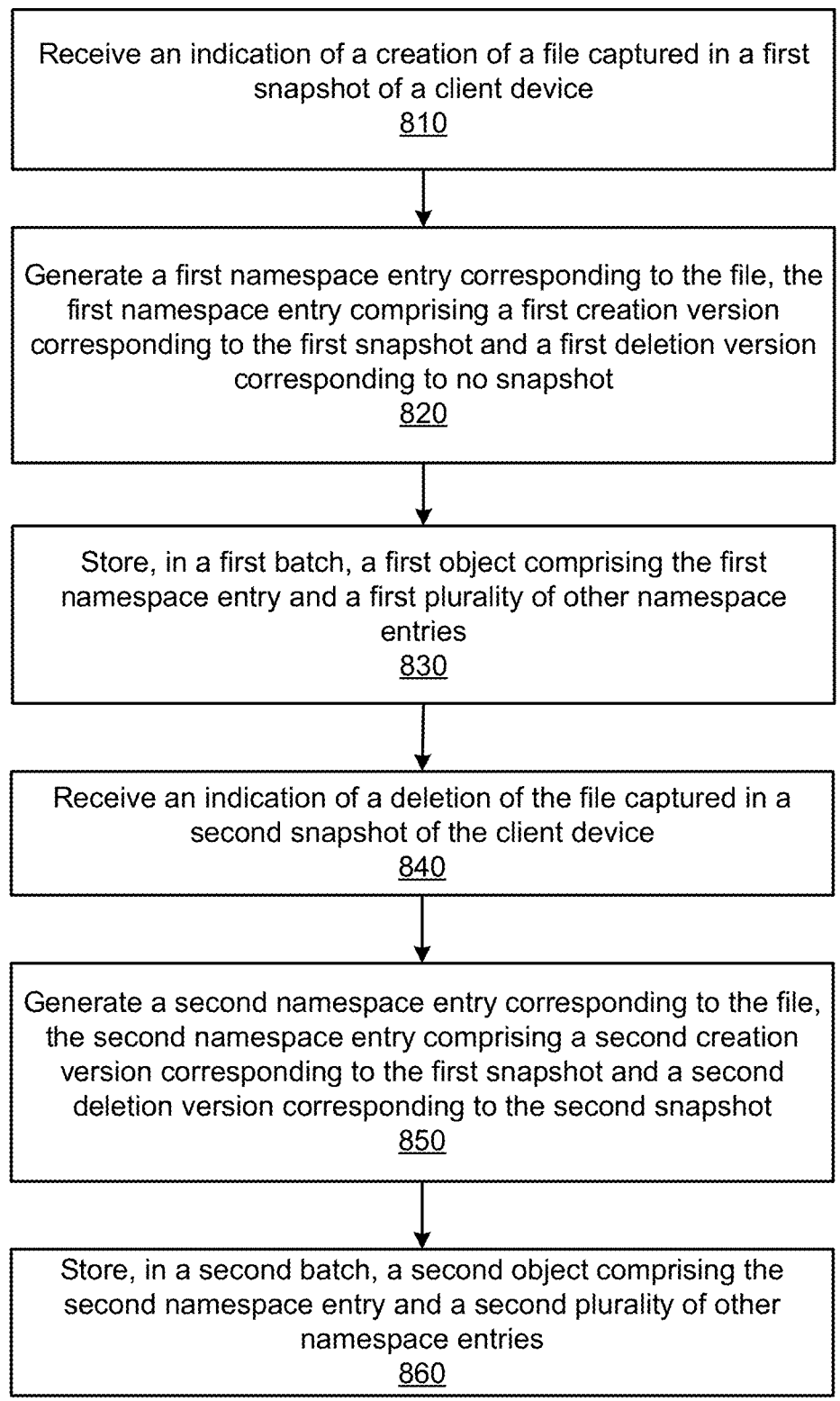
FIG. 8 is a flowchart depicting an example creation and deletion process of a file system, in accordance with an embodiment.

FIG. 8 is a flowchart depicting an example process of performing a file creation and deletion process by a file system, in accordance with an example embodiment. The file system receives 810 an indication of a creation of a file captured in a first snapshot of a client device. For example, a file management server of the file system may compare the files in the first snapshot to snapshots that are prior to the first snapshot to determine what files are new. The comparison may involve generating checksums of the files and comparing the checksums to deduplication indices stored in a distributed database. The file system generates 820 a first namespace entry corresponding to the newly created file. The first namespace entry may be a first key-value pair. The first namespace entry may include a first creation version corresponding to the first snapshot and a first deletion version corresponding to no snapshot because the newly created filed has not been deleted. The first namespace entry may be first saved temporarily in a memory. The file system stores 830, in a first batch, a first object to a storage such as an object storage. The first object includes the first namespace entry and may include a first plurality of other namespace entries.

At a time after the creation of the file, the file system may receive 840 an indication of a deletion of the file that is captured in a second snapshot of the client device. The file system generates 850 a second namespace entry corresponding to the file. The second namespace entry may be a second key-value pair. The second namespace entry may include a second creation version corresponding to the first snapshot and a second deletion version corresponding to the second snapshot. The second namespace entry first may be saved temporarily in a memory. The file system stores 860, in a second batch, a second object to a storage such as an object storage. The second object includes the second namespace entry and may include a second plurality of other namespace entries.

After the second namespace entry is created, the file system may perform a merge operation and a compaction operation. For example, the file system may merge the first namespace entry and the second namespace entry to generate a third namespace entry that includes a third creation version that has the same value of the first creation version and a third deletion version that has the same value of the second deletion version.

Figure 9:
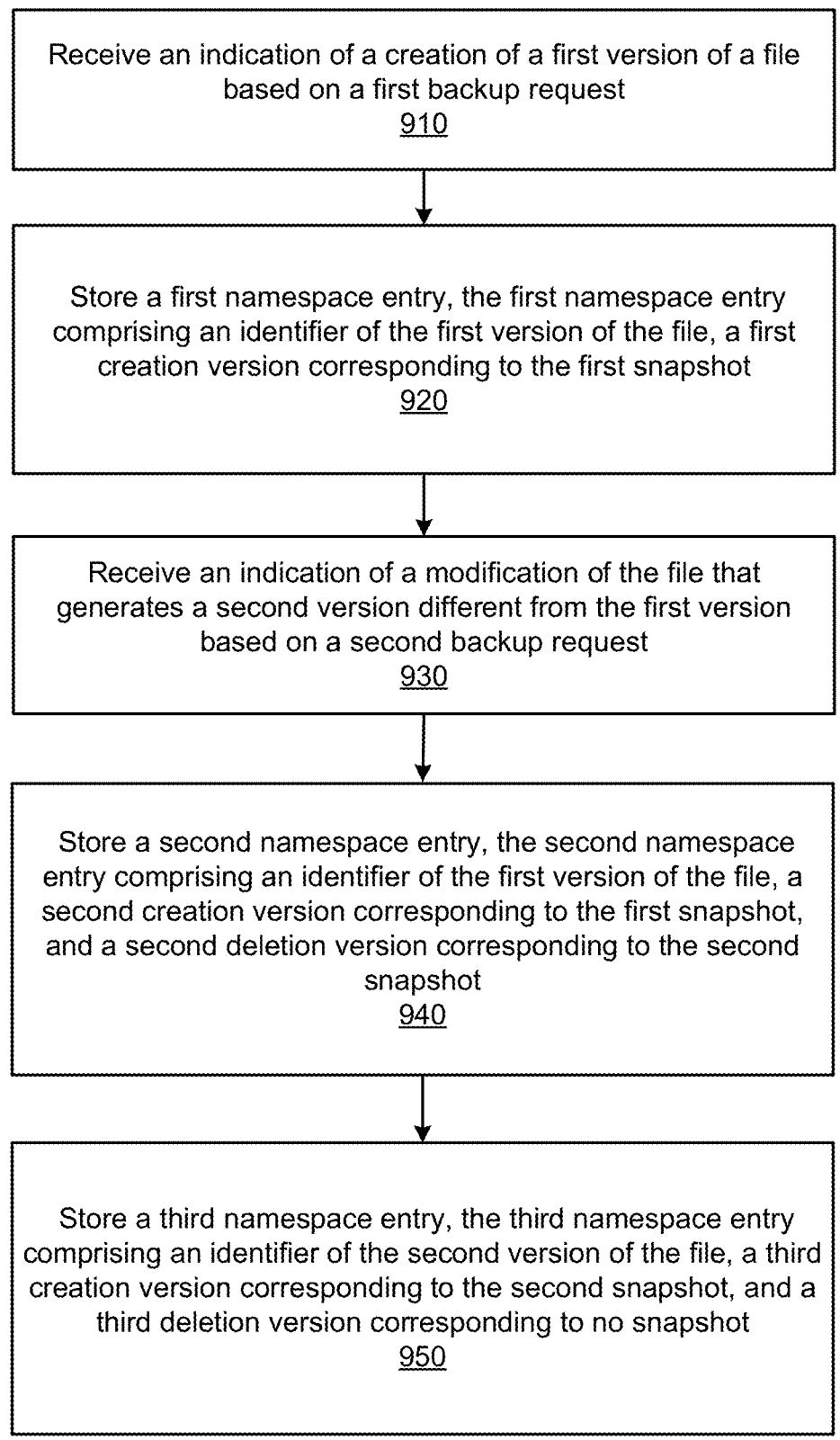
FIG. 9 is a flowchart depicting an example modification process of a file system, in accordance with an embodiment.

FIG. 9 is a flowchart depicting an example process of performing a file modification process by a file system, in accordance with an example embodiment. The file system receives 910 an indication of a creation of a file based on a first backup request and/or captured in a first snapshot of a client device. The file system stores 920 a first namespace entry, which may be a first key-value pair. The first namespace entry may include an identifier of the first version of the file. The first namespace entry may also include a first creation version corresponding to the first snapshot. The first namespace entry may further include a first deletion version corresponding to no snapshot.

At a time after the creation of the file, the file system may receive 930 an indication of a modification of the file based on a second backup request associated with a second snapshot. The modification may include the generation of a second version of the file different from the first version. The file system treats the modification as the deletion of the first version and the creation of the second version. The file system stores 940 a second namespace entry, which may be a second key-value pair. The second namespace entry may include an identifier of the first version of the file. The second namespace entry may also include a second creation version corresponding to the first snapshot. The second namespace entry may further include a second deletion version corresponding to the second snapshot.

In treating the modification as a creation of the second version, the file system stores 950 a third namespace entry, which may be a third key-value pair. The third namespace entry may include an identifier of the second version of the file. The third namespace entry may also include a third creation version corresponding to the second snapshot. The third namespace entry may further include a third deletion version corresponding to no snapshot because the second version is newly created.

After the second and third namespace entries are created, the file system may perform a merge operation and a compaction operation. For example, at a later time when all snapshots between (and including) the first snapshot and the second snapshot are no longer active, the first version of the file is hence no longer referenced in any active snapshots. The file system may then perform a compaction operation to remove all namespace entries that correspond to the first version of the file.

Figure 10:
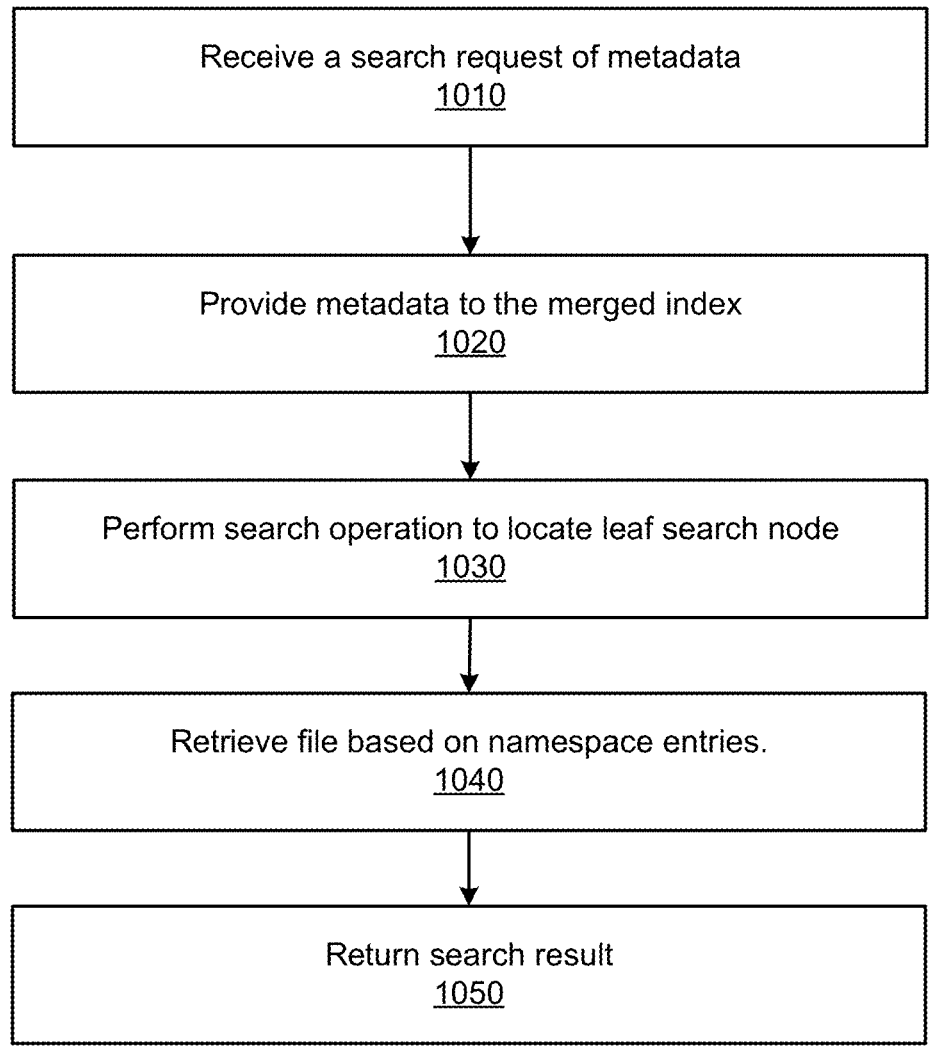
FIG. 10 is a flowchart depicting an example search process of a file system, in accordance with an embodiment.

FIG. 10 is a flowchart depicting an example search process of a file system, in accordance with an example embodiment. The file system receives 1010 a search request of metadata, for example, form a client device through an API call or a front-end user interface. The metadata may be metadata of files and/or metadata of emails such as sender, recipient, and/or subject lines. The file system provides 1020 the metadata query to the merged index. The file system performs 1030 search operation to locate leaf search nodes in the merged index. The location of the leaf search nodes may include loading various S3Tables and traversing the S3Tables to locate the relevant leaf nodes. The file system may combine the data in one or more namespace entries on the fly. For example, a file may be associated with different versions and, thus, different entries that store the creation and deletion versions of each version. Based on the namespace entries, the file system retrieves 1040 files and/or emails, for example, from an object storage that saves the files as objects or from other storages. The file system returns 1050 the search result to the requestor of the search.

Example Machine Architecture

Figure 11:
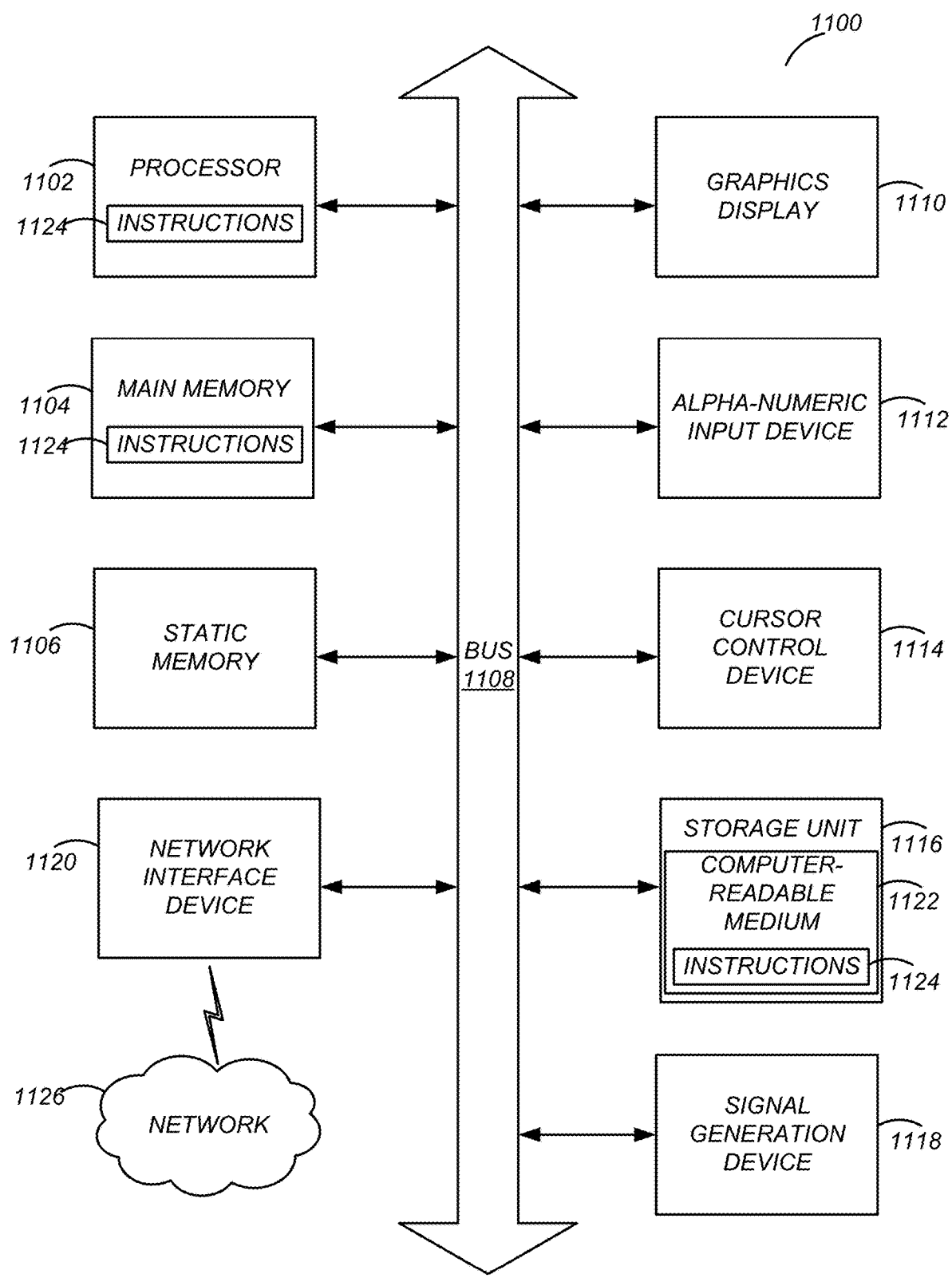
FIG. 11 is a block diagram illustrating components of an example machine able to read instructions from a machine-readable medium and execute them in a processor or controller, in accordance with an embodiment.

FIG. 11 is a block diagram illustrating components of an example machine for execution of processes and modules described in FIGS. 1-10. Specifically, FIG. 11 shows a diagrammatic representation of a machine in the example form of a computer system 1100 within which instructions 1124 (e.g., program code or software), which may be stored in a non-transitory computer-readable medium for causing the machine to perform any one or more of the methodologies discussed herein may be executed. In one embodiment, the machine may operate as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. For example, the machine may be any component shown in FIG. 1. Further, while only a single machine is illustrated, the term "machine" may also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static non-volatile memory 1106, which are configured to communicate with each other via a bus 1108. The computer system 1100 may further include graphics display unit 1110 (e.g., to drive onto a surface for visual viewing such as a screen or a projection unit that can display onto a surface), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a non-transitory computer-readable medium 1122 on which instructions 1124 (e.g., software) embodying any one or more of the methodologies or functions described herein may be stored. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 112 also constituting machine-readable media. The instructions 1124 (e.g., software) may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The term "computer-readable medium" shall also be taken to include any medium that is capable of storing instructions (e.g., instructions 1124) for execution by the machine and that cause the machine (e.g., one or more processors) to perform any one or more of the methodologies disclosed herein. The term "computer-readable medium" includes, but not be limited to, data repositories in the form of non-transitory memories such as solid-state memories, optical media, and magnetic media.

Additional Considerations

The disclosed configuration includes a number of benefits and advantages. For example, using object storage to store merged indices in accordance with an example embodiment described herein allows a file system to scale with high consistency and reliability. Objects can be accessed directly by multiple computers and/or through APIs. Hence, different computers of a file system may access and request to store the entries in the merged index through API calls. This allows the file system to scale exponentially without the drawbacks of conventional file servers that require high cost to expand consistently and reliably. As different S3Tables are created by different computer, the merged index may consolidate the entries by performing merging and compaction in the background to improve performance and operating speed of the file system. This streamlines an entire operation of the file system.

Some processes and operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain an embodiment is described herein as including logic or a number of components, modules, or mechanisms. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1302, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to the desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system and a process for building a merge index on top of object storage and using the merge index to implement a file system search engine. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for operating a file system, the method comprising:
generating, responsive to a creation of a first version of a file captured in a first snapshot, a first namespace entry associated with the first version, the first namespace entry comprising a first creation version corresponding to the first snapshot;
generating, responsive to a modification of the file from the first version to a second version captured in a second snapshot, a second namespace entry associated with the first version, the second namespace entry comprising a second creation version corresponding to the first snapshot and a second deletion version corresponding to the second snapshot; and
generating a third namespace entry associated with the second version, the third namespace entry comprising a third creation version corresponding to the second snapshot and a third deletion version corresponding to no snapshot.

2. The method of claim 1, wherein the first namespace entry is included in a first object that is stored in an object storage and the second namespace entry is included in a second object that is stored in the object storage, the second object being different from the first object.

3. The method of claim 2, further comprising:
merging the first object and the second object to generate a third object, the third object comprising at least one namespace entry copied from the first object and at least one namespace entry copied from the second object.

4. The method of claim 1, further comprising:
generating a fourth namespace entry is created by merging the first and second namespace entries, the fourth namespace entry a fourth creation version corresponding to the first snapshot and a fourth deletion version corresponding to the second snapshot.

5. The method of claim 1, further comprising:
providing, responsive to a request to list the second snapshot, a response indicating the first version of the file is not in the second snapshot based on the second deletion version in the second namespace entry.

6. The method of claim 1, further comprising:
removing the first snapshot as an active snapshot; and
compacting at least the first namespace entry and the second namespace entry.

7. The method of claim 1, further comprising:
accessing a plurality of namespace entries that are associated with the file; and
creating a merged namespace entry comprising a creation version selected from a first of the plurality of namespace entries and a deletion version selected from a second of the plurality of namespace entries.

8. A non-transitory computer-readable medium configured to store computer code comprising instructions, the instructions, when executed by one or more processors, causes the one or more processors to:
generate, responsive to a creation of a first version of a file captured in a first snapshot, a first namespace entry associated with the first version, the first namespace entry comprising a first creation version corresponding to the first snapshot;
generate, responsive to a modification of the file from the first version to a second version captured in a second snapshot, a second namespace entry associated with the first version, the second namespace entry comprising a second creation version corresponding to the first snapshot and a second deletion version corresponding to the second snapshot; and
generate a third namespace entry associated with the second version, the third namespace entry comprising a third creation version corresponding to the second snapshot and a third deletion version corresponding to no snapshot.

9. The non-transitory computer-readable medium of claim 8, wherein the first namespace entry is included in a first object that is stored in an object storage and the second namespace entry is included in a second object that is stored in the object storage, the second object being different from the first object.

10. The non-transitory computer-readable medium of claim 9, wherein the instructions, when executed, further cause the one or more processors to:
merge the first object and the second object to generate a third object, the third object comprising at least one namespace entry copied from the first object and at least one namespace entry copied from the second object.

11. The non-transitory computer-readable medium of claim 8, wherein the instructions, when executed, further cause the one or more processors to:
generate a fourth namespace entry is created by merging the first and second namespace entries, the fourth namespace entry a fourth creation version corresponding to the first snapshot and a fourth deletion version corresponding to the second snapshot.

12. The non-transitory computer-readable medium of claim 8, wherein the instructions, when executed, further cause the one or more processors to:
provide, responsive to a request to list the second snapshot, a response indicating the first version of the file is not in the second snapshot based on the second deletion version in the second namespace entry.

13. The non-transitory computer-readable medium of claim 8, wherein the instructions, when executed, further cause the one or more processors to:
remove the first snapshot as an active snapshot; and
compact at least the first namespace entry and the second namespace entry.

14. The non-transitory computer-readable medium of claim 8, wherein the instructions, when executed, further cause the one or more processors to:
access a plurality of namespace entries that are associated with the file; and
create a merged namespace entry comprising a creation version selected from a first of the plurality of namespace entries and a deletion version selected from a second of the plurality of namespace entries.

15. A system comprising:
a client device configured to store a file; and
an index system in communication with the client device, the index system comprising memory and one or more processors, the memory configured to store computer code comprising instructions, the instructions, when executed by the one or more processors, cause the one or more processors to:
generate, responsive to a creation of a first version of the file captured in a first snapshot, a first namespace entry associated with the first version, the first namespace entry comprising a first creation version corresponding to the first snapshot;
generate, responsive to a modification of the file from the first version to a second version captured in a second snapshot, a second namespace entry associated with the first version, the second namespace entry comprising a second creation version corresponding to the first snapshot and a second deletion version corresponding to the second snapshot; and
generate a third namespace entry associated with the second version, the third namespace entry comprising a third creation version corresponding to the second snapshot and a third deletion version corresponding to no snapshot.

16. The system of claim 15, wherein the first namespace entry is included in a first object that is stored in an object storage and the second namespace entry is included in a second object that is stored in the object storage, the second object being different from the first object.

17. The system of claim 16, wherein the instructions, when executed, further cause the one or more processors to:
merge the first object and the second object to generate a third object, the third object comprising at least one namespace entry copied from the first object and at least one namespace entry copied from the second object.

18. The system of claim 15, wherein the instructions, when executed, further cause the one or more processors to:
generate a fourth namespace entry is created by merging the first and second namespace entries, the fourth namespace entry a fourth creation version corresponding to the first snapshot and a fourth deletion version corresponding to the second snapshot.

19. The system of claim 15, wherein the instructions, when executed, further cause the one or more processors to: provide, responsive to a request to list the second snapshot, a response indicating the first version of the file is not in the second snapshot based on the second deletion version in the second namespace entry.

20. The system of claim 15, wherein the instructions, when executed, further cause the one or more processors to: remove the first snapshot as an active snapshot; and compact at least the first namespace entry and the second namespace entry.

\* \* \* \* \*